United States Patent [19]
Norberg

[11] Patent Number: 5,903,064
[45] Date of Patent: May 11, 1999

[54] DISTRIBUTION NETWORK AND METHOD AND DEVICE FOR REGULATING ELECTRIC CURRENT FROM THE NETWORK

[75] Inventor: Calle Norberg, Gävle, Sweden

[73] Assignee: Vattenfall AB (Public), Stockholm, Sweden

[21] Appl. No.: 08/765,219

[22] PCT Filed: Jul. 3, 1995

[86] PCT No.: PCT/SE95/00820

§ 371 Date: Jan. 28, 1997

§ 102(e) Date: Jan. 28, 1997

[87] PCT Pub. No.: WO96/01520

PCT Pub. Date: Jan. 18, 1996

[30] Foreign Application Priority Data

Jul. 4, 1994 [SE] Sweden .................................. 9402358

[51] Int. Cl.⁶ .................................................. H02J 1/00
[52] U.S. Cl. ............................. 307/40; 235/382; 307/9.1; 340/310.06
[58] Field of Search .................................. 307/1, 126, 9.1, 307/10.1, 11, 31, 40; 361/171, 172; 340/310.01, 310.06, 825.3, 825.31, 825.34, 825.35, 932.2, 933; 235/381, 382; 364/479.01, 479.02; 395/218; 180/65.1; 320/2, DIG. 1, 137, 104, 106; 705/16, 18, 23

[56] References Cited

U.S. PATENT DOCUMENTS

| | | |
|---|---|---|
| 4,352,992 | 10/1982 | Buennagel et al. . |
| 4,442,492 | 4/1984 | Karlsson et al. . |
| 4,454,509 | 6/1984 | Buennagel et al. .................... 307/40 |
| 4,459,672 | 7/1984 | Buennagel et al. . |
| 4,471,232 | 9/1984 | Peddie et al. .............................. 307/40 |
| 4,524,288 | 6/1985 | Schimmelpennink et al. ........... 307/40 |
| 4,532,418 | 7/1985 | Meese et al. ............................... 320/2 |
| 5,327,066 | 7/1994 | Smith ......................................... 320/2 |
| 5,455,464 | 10/1995 | Gosling .............................. 340/310.01 |

FOREIGN PATENT DOCUMENTS

| | | |
|---|---|---|
| 0 047 089 | 3/1982 | European Pat. Off. . |
| 425123 | 2/1981 | Sweden . |
| 9202517 | 9/1992 | Sweden . |
| 9202823 | 3/1994 | Sweden . |
| 2 107 093 | 4/1983 | United Kingdom . |

Primary Examiner—Richard T. Elms
Attorney, Agent, or Firm—Burns, Doane, Swecker & Mathis, L.L.P.

[57] ABSTRACT

The present invention relates to a distribution network comprising electric wires (5) for distribution of electric current, a plurality of tap-off facilities (6) with at least one socket (9) for tapping off electric current to optional power-consuming units (1), and a central computer unit (10) communicating with the individual tap-off facilities. At least some tap-off facilities (6) in the network comprise a switch (13) and a regulating device (11) with a microprocessor (21), a user connecting a power-consuming unit (1) to one of said tap-off facilities being identifiable to the central computer unit (10) or to the regulating device (11) via a microprocessor in the power-consuming unit, and the regulating device, in case of accepted identification, keeping the switch (13) closed and permitting tap-off of electric current from the socket (9), whereas, in case of non-accepted identification, the regulating device keeps the switch open and prevents tap-off of electric current form the socket (9). The invention also related to a device and a method for respectively permitting and preventing current supply from the network.

29 Claims, 4 Drawing Sheets

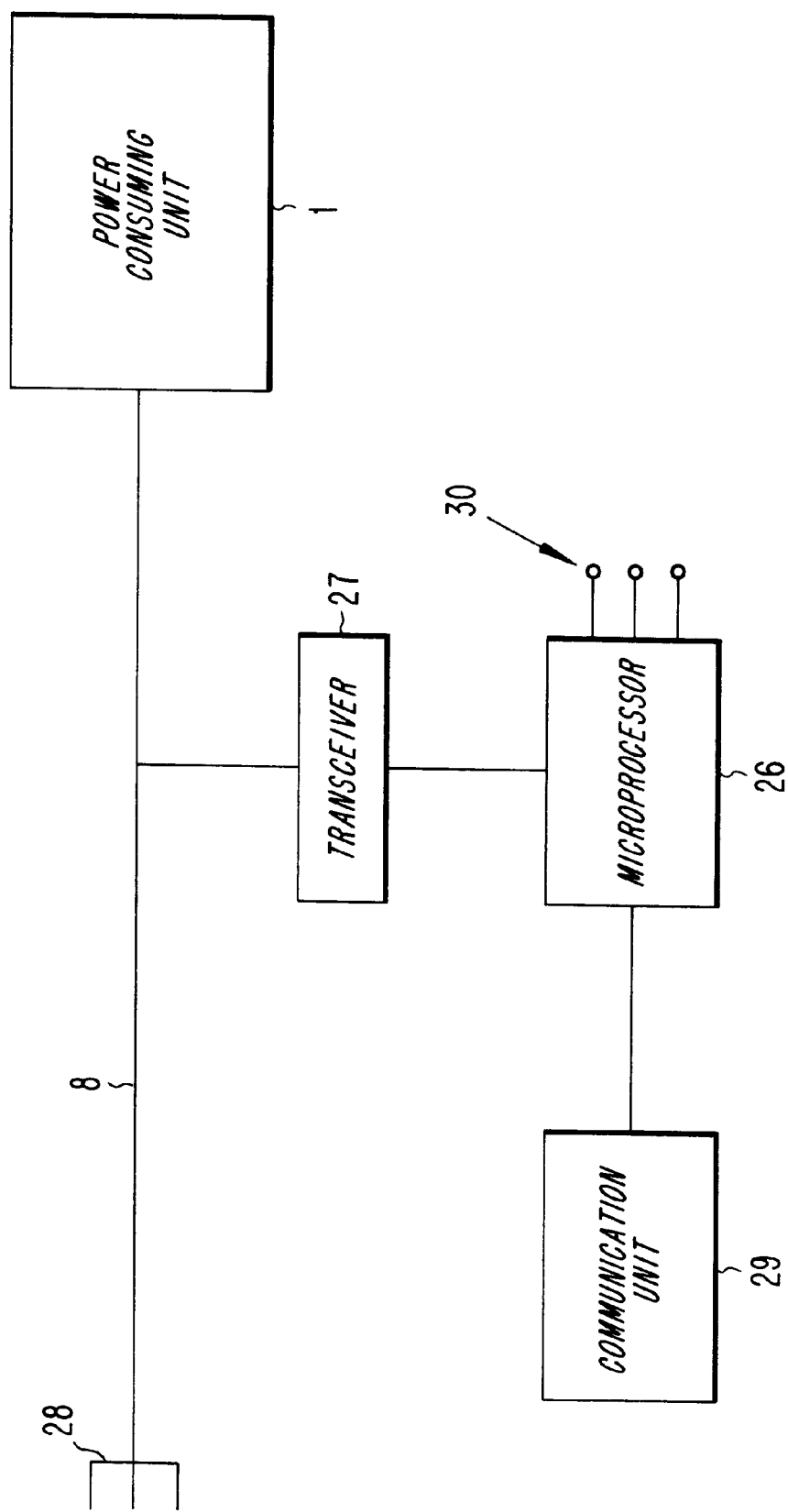

DISTRIBUTION NETWORK AND METHOD AND DEVICE FOR REGULATING ELECTRIC CURRENT FROM THE NETWORK

The present invention relates to a distribution network comprising electric wires for distributing electric current, a plurality of tap-off facilities with at least one socket means for tapping off electric current to optional power-consuming units, and a central computer unit communicating with the individual tap-off facilities.

The invention also relates to a device and a method for permitting and preventing the supply of current from the network.

BACKGROUND OF THE INVENTION

For self-evident reasons, distribution networks are stationary installations and this is reflected by the manner in which electric energy has been charged. Thus, groups of tap-off facilities in the form of socket means and/or stationary installations, for instance in a house property or a flat, have been connected to the distribution network via an electricity meter, and for each electricity meter a physical or juristical person has been liable for payment. Concurrently with an increased use of electric appliances and machinery and the continued development of electrically driven vehicles, the individual users will in future have an increased need of using electric energy also outside the place where they live and their place of work. For instance, there will be a great demand for "filling stations" for electric cars.

By using a differentiated charging system, in which an individual user pays for the electric energy consumed, independently of the geographic point at which the consumption takes place, it would, for example, be possible to arrange tap-off facilities in conjunction with parking places and the like, such that the person at the time using a parking place can use the time of stoppage to recharge the batteries of the car and/or heat the passenger compartment before starting in a cold climate or in cold weather, or cooling the compartment in a warm climate. Customers in such a power-charging system would probably be prepared to pay a higher price of energy for increased accessibility of electric energy.

It is known to communicate from a central computer with individual electricity meters via signals superimposed on the distribution network, thereby obtaining additional functions and supplying the customers with additional services. For instance, it is possible to accomplish, by such a system, the reading of individual electricity meters directly from the central computer, or to provide electricity meters with card readers, as disclosed in e.g. GB 2,107,093, thereby facilitating the charging of consumed electric energy. By means of push buttons in the electricity meter cupboard it is also possible for the user to communicate with the central computer and, for instance, request activation of an external current circuit, such as request from the house or flat switching-on of electric heating in a weekend cottage or the like. Such a system implies, however, merely that an individual electricity meter is identifiable and that the person liable for payment of the electricity meter is charged with the consumed electric energy. Thus, charging is still effected in respect of a fixed geographic point.

SE 9202514-7 discloses the controlling of a group of tap-off facilities, which are arranged e.g. at a parking place or a caravan site, from a control board. In such an establishment, the user is obliged to walk to the control board, identify himself by means of a charge card or the like and, via a set of buttons, select which tap-off facility/facilities he wishes to use and pay the electricity charges therefor. Communication between the control board and the respective tap-off facilities is intended to occur via radio signals or data circuits especially arranged for the purpose. By the user being obliged to be present at the control board for identification and selection of tap-off facilities, such establishments must, of course, be restricted to a small area. Moreover, the user will obtain but little safety, since his plug can easily be removed by an unauthorised person who may then put his own plug into the socket and so "steal" electric current which the rightful user will have to pay.

SE 9202823-2 discloses a recharging device for recharging the energy storage units of an electric vehicle. The only purpose of this recharging device is to reduce the load on the distribution network and to serve as an adaptation circuit to permit recharge of the vehicle with electric current having a varying number of phases and varying voltages and frequencies. The device may also comprise a transmitter and a receiver for communication via the distribution network.

SE 425,123 discloses a plant for central and automatic reading, registration and control of energy consumption meters mounted at the consumer's premises. An individual electricity meter communicates with the power distributor via signals superimposed on the distribution network. The purpose is to provide a plant having better means for optimum utilisation of the electric energy at its cheapest. Charging thus occurs in respect of a fixed geographic point.

U.S. Pat. No. 4,352,992 discloses a load management system in which load controllers selectively connect and disconnect high power deferrable loads on the distribution network in order to permit levelling of periods of peak load demand. The communication between the power distributor and the power consumer occurs via radio signals. Charging occurs in respect of a fixed geographic point.

EP 0 047 089 concerns an apparatus and a method for connecting and disconnecting power-consuming units to and from the distribution network in a predetermined priority order for the purpose of permitting automatic disconnection of current during periods of peak load demand and, thus, at a high price of energy. Like before, charging occurs in respect of a fixed geographic point.

BRIEF DESCRIPTION OF THE INVENTIVE IDEA

A main object of the present invention is to increase the accessibility of electric energy and to provide a distribution network, in which charging of electric energy is permitted not only with respect to a fixed geographic point, but also with respect to an individual user independently of his geographic place of residence. A further object is that the increased accessibility of electric energy should occur while achieving great safety for the user in respect of unauthorised use. It is also an object of the invention to permit use and/or extension of the distribution network for additional functions and services such as automatic connection and disconnection of power-consuming units, alarm indication in case of technical defects in the power-consuming unit or unauthorised disconnection thereof, and/or remotely readable performance checks.

A subordinated object of the invention is that the increased accessibility should be achieved with a minimum of reconstruction of existing distribution networks. This can be achieved by letting the communication between the computer unit, the regulating device and the power-consuming unit occur wholly or partly via signals superimposed on the distribution network.

The invention is based on the knowledge of using microprocessors for identifying individual electricity consumers and letting each individual microprocessor communicate, preferably via signals superimposed on the network, with a centrally or locally positioned microprocessor-containing regulating device or computer unit. This results in a simple and flexible system for identifying individual electricity consumers and possibilities of simple and efficient charging of consumed electric energy. Each microprocessor is made with a unique identification code which can be used to identify the user. In addition to this identification code, a microprocessor has plenty of data processing capacity for further increasing the safety in respect of unauthorised use of the identification codes. For instance, a non-readable, secret algorithm can be programmed into each microprocessor, for encrypting, by means of e.g. random numbers produced in the microprocessor, the identification code before transmission occurs on the network.

The great data capacity of the microprocessors also affords possibilities of extending the system by additional functions, such as automatic connection and disconnection of power-consuming units, which can be carried out by remote control, for instance, requesting, via a computer or a speech-answering system on the telecommunication network, recharging of an electric car which is parked in some other place, the microprocessor of the car functioning as an addressing unit which selectively can receive signals from the network and which, by the computer units and regulating devices of the network, is used to locate the position of the car. Connection and disconnection can also be carried out in a time-controlled or temperature-controlled manner, for instance, recharging of an electric car with a certain amount of energy can be requested from or up to a certain point of time, or heating of the car can be requested if the outdoor temperature falls below a certain level. It is also possible to extend the system by an alarm function, which via a computer or a telephone can draw the user's attention to the fact that, for example, an electric car has been disconnected from the distribution network or that a technical defect has arisen. From another place, it is also possible to carry out via a computer a performance check of e.g. the state of charging of an electric car.

A distribution system or network according to the invention can be combined with card readers for a smart card containing a microprocessor. This would make it possible for the card owner to identify himself and authorise debiting his/her account with the cost of consumed energy for a power-consuming unit, which in turn contains a microprocessor of its own. This will be of immediate interest when borrowing or hiring, for instance, a car, and the authorisation can be carried out via e.g. a card reader in the car. It is also possible to let the microprocessor-containing card completely replace the microprocessor of the identification circuit, in which case the power-consuming unit will be without any identifying microprocessor as soon as the card has been removed. The system can also be supplemented with a keyboard, a display device and the like, for instance in a car, to permit the user to order additional services, such as time-controlled connection of power supply.

A distribution network according to the invention can be built up in different ways. In its simplest form, it may consist of a plurality of tap-off facilities which are regulated by microprocessor-containing regulating devices which are connected to a central computer unit via signals superimposed on the network. In another embodiment, the signals, superimposed on the network, to and from a plurality of regulating devices can be collected by a collecting unit which in a known manner is connected to a central computer via radio or data circuits. Moreover, a plurality of central computer units can be connected to a master computer or be interconnected in a computer network. It may be said in general that data communication via signals superimposed on the distribution network has a relatively limited range, and in any case, data communication past a transformer station must be effected in some other suitable manner.

Correspondingly, the tap-off facilities and the microprocessor-containing regulating devices can be arranged in various ways relative to each other. In one embodiment, the tap-off facility and the regulating device can be designed in an integrated fashion, in which case there are at least one microprocessor and one switch for each socket means. In places where a number of tan-off facilities are collected close to each other, for instance in a parking place, a microprocessor can regulate a plurality of switches and socket means. Besides, it is not necessary for the socket means to be fed in parallel by separate lines, but each switch and socket means could, for example, be identified and regulated by the microprocessor via pulse-sensing logic circuits or the like and, thus, be fed in serial connection by common lines.

Because of the great storage capacity of the microprocessors, identification and access control need not always be carried out by the central computer unit but can be carried out by the microprocessor of the respective regulating devices or a storage device separately arranged in connection with the microprocessor. At given intervals, the regulating devices can be provided with undated "lists" of authorised or unauthorised users. In such a distribution system, the identification and access control can be carried out in a simpler, quicker and cheaper fashion.

In one embodiment of the invention, the socket means of the tap-off facility can have mains voltage in the unused state. As soon as a power-consuming unit is connected to the socket means, the network senses this and the regulating device will switch off the current if a non-accepted access control has been effected within a given period of time. For security reasons, it would instead be possible to feed the tab-off facility with a lower voltage in the unused state in order to permit identification, but with no risk of injuries in, for example, children who, when playing, put foreign objects into the socket means. In the cases in which the power-consuming unit has a source of current of its own, such as a car, the socket means could be completely dead in its unused state, in which case the source of current of the car, when connected, can actuate a relay that closes the switch to enable identification.

A distribution network according to the present invention should, besides identifying the user and supplying electric current, be able to measure either the amount so energy consumed or the time during which a power-consuming unit is connected. The measurement may suitably be carried out by the microcomputer of the regulating device, but it is also possible to use a separate meter or to use the microcomputer of the power-consuming unit as a meter which transmits consumption data to the central computer.

The microprocessor of the regulating device may have various tasks and functions. In a preferred embodiment, its task is e.g. to carry out the following steps; activating the microprocessor of the identification circuit such that this microprocessor emits an identification signal, emitting an addressing signal accompanying the identification signal to the central computer unit, receiving a response signal from the computer unit when this has checked the identification signal and, in response to a negative or positive response signal, effecting switching off or switching on of the current in the tap-off facility. In a smaller system, such as a caravan site, it may also serve to carry out identification of the user and store information, in which case a central computer unit checks, on the occasion of charging, in the microprocessor of each tap-off facility, in which place the user has consumed energy and the amount thereof during his stay.

According to the present invention, a distribution network is provided, which is easily accessible, reliable and user-friendly and which in a preferred embodiment does not require separate charge cards and/or codes. It is particularly well suited for movable users and power-consuming units such as cars. However, it is also possible to use the invention for trackbound, electrically driven traffic, in which case the electrically conductive lines can be divided into sections. In the transition from one section to another, it is checked whether the train or the vehicle is authorised to run on the distance. The terms tap-off facility and socket means thus have a wide sense and may also include overhead lines or conductor rails for railways. It is, however, also possible to use the invention for more "stationary" power-consuming units. This may involve e.g. buildings accommodating a group of companies, exhibitions and market trade, where one and the same tap-off facility may have many different users for a short period of time. In such applications, the microprocessor of the power-consuming unit may suitably be arranged in an adapter in the form of a junction box. The invention may also be used in, for instance, a company in which different departments and profit centres use the same tap-off facilities.

BRIEF DESCRIPTION OF THE ACCOMPANYING DRAWINGS

In the drawings:

FIG. 1 is a simplified basic sketch of a distribution network according to the present invention, to which an electric car is to be connected for recharging, FIG. 2 is a wiring diagram of part of a preferred embodiment of a regulating device according to the present invention, FIG. 3 is a schematic block diagram of two different embodiments of tap-off facilities, and FIGS. 4 and 5 are schematic block diagrams of possible embodiments of a regulating device and an identification circuit.

DESCRIPTION OF PREFERRED EMBODIMENTS OF THE INVENTION

Figure 1:
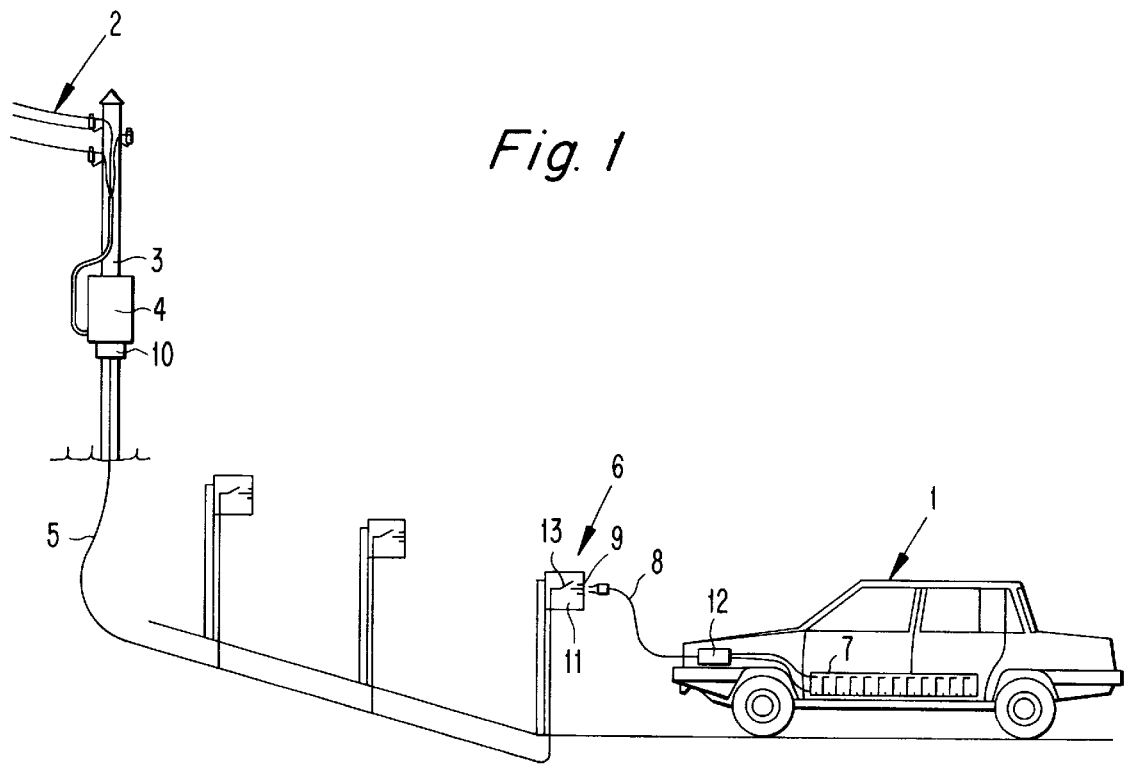

Reference is now made to FIG. 1, which illustrates a simplified distribution network according to the present invention. In the Figure, an electric car 1 has been selected as an example of a power-consuming unit. However, it should be understood that many other types of electrically operated machines and apparatus can be connected in the same manner to the network. The distribution network shown in the Figure comprises a power line 2 with three overhead lines for high-voltage current, which via a pole 3 are passed to a transformer station generally designated 4. The high-voltage network changes after the transformer station 4 into a low-voltage network, which in the Figure is shown as a buried line 5 branching off to a number of tap-off facilities 6 which are supposed to be placed in a public car park.

The electric car 1 comprises a set of accumulator batteries 7 which are used to store the electric energy required for driving the car. The batteries 7 are rechargeable by connecting a plug at the end of a cable 8 to a socket 9 of the individual tap-off facility 6.

The inventive distribution network comprises at least one computer unit 10 and a regulating device 11 for each of the tap-off facilities 6. For identification of the user, the electric car is further provided with an identification circuit 12. When connecting the electric car to the tap-off facility 6, the computer unit 10, the regulating device 11 as well as the identification circuit 12 can communicate with each other via signals superimposed on the distribution network and, to this end, each of these comprises a so-called transceiver, i.e. a transmitter/receiver to enable said communication. The computer unit 10, the regulating device 11 and the identification circuit 12 are shown only schematically as appliance boxes and each comprise in addition to a transceiver also a microprocessor. The regulating device 11 further comprises a switch schematically shown at 13, preferably a so-called semiconductor relay, for optionally switching on or off the current to the socket means 9.

In its unused state, when no power-consuming unit is connected to the socket means 9, the switch 13 is open. When connecting the electric car 1 to the socket means 9, the following will take place according to the invention. The regulating device 11 senses that a power-consuming unit is connected, and effects the closing of the switch 13 for a short period, suitably 1/10-1 s. During this period, the microprocessor of the regulating device 11 activates the microprocessor of the identification circuit 12 to emit an identification signal which is transmitted via the distribution network to the computer unit 10 in which it is checked to establish whether the user is authorised to use the distribution network. In case of the identification signal being accepted, this is reported to the microprocessor of the regulating device, the microprocessor providing for the switch 13 being kept closed, and the electric car can thus receive current from the socket means 9. If, on the other hand, the identification signal is not accepted by the computer unit 10, the regulating device 11 will interrupt the current.

Figure 2:
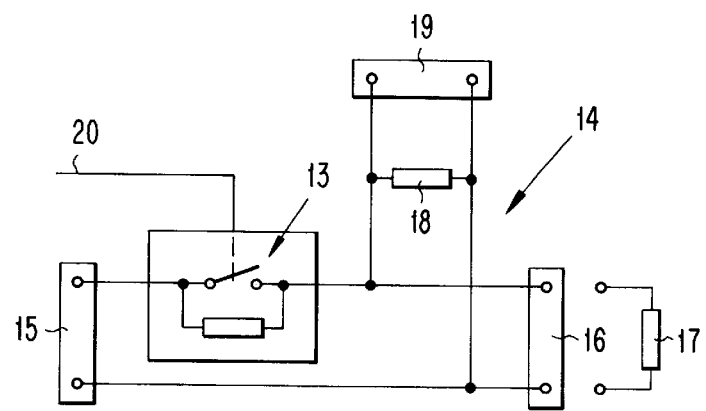

Reference is now made to FIG. 2, which illustrates a wiring diagram of a preferred embodiment of a sensing circuit 14 for the switching-off function of the regulating device 11. This comprises a semiconductor relay 13 which is connected between an inlet 15 and an outlet 16. The inlet 15 is permanently connected to mains voltage. A semiconductor relay has the quality of having, also in a switching-off position, a certain amount of leakage current such that the outlet 16 in its unloaded state will have a voltage corresponding to the voltage on the inlet 15. A power-consuming unit which is schematically illustrated as a resistor and is designated 17 has a certain impedance. A resistor 18 is connected across the outlet 16 and the voltage drop across this resistor can be measured across a measuring outlet 19. When the power consumer 17, the impedance of which is much lower than that of the resistor 18, is connected to the outlet 16, the voltage drop across the resistor 18 falls to a value close to zero. The relay may then via the control input 20 be ordered by the microprocessor to switch on the current for at least a short period of time. By using a semiconductor relay and connecting it in the manner illustrated and described, a simple and inexpensive sensor is obtained, sensing when a power-consuming unit is connected to the network, and the switch can thus be closed instantaneously in order to permit identification of the user.

In the embodiment shown, the identification circuit 12 is included in the power-consuming unit. There is, however, nothing to prevent the identification circuit 12 from being designed as a separate junction box to make it possible for e.g. a craftsman to connect one or a few tools to the network. Moreover, it is not necessary that the regulating device 11 be integrated with the socket means 9, but they can be placed in separated positions.

For measuring the amount of consumed electric energy, an electricity meter or time meter is suitably arranged in or in connection with each tap-off facility 6, the microprocessor of the regulating device effecting the forwarding of the consumption data to the computer unit 10 to serve as data for charging the user. However, it would be possible to arrange the meter in the actual power-consuming unit, for instance an electric car, from which information on the amount of consumed energy is continuously transmitted to the computer unit. As a meter, use can be made of the microprocessor either of the regulating device or of the identification circuit.

In the embodiment described above of the distribution network according to the present invention, the computer unit 10 is arranged in connection with a transformer station. However, the invention is no way restricted to this embodiment, but the positioning has been selected merely as an example of a possible place for the computer unit. In actual practice, the computer unit can be placed in an optional position-in a distribution network, and a plurality of computer units can be interconnected to a regional network or a network covering the whole country. Such interconnection need not be carried out over the distribution network, but can be provided in an optional manner, for instance via radio, telephone or satellite.

Existing distribution networks can be rebuilt, without any extensive operations, into a network of the type described above. The most realistic alternative seems to be that in future, distribution networks include the possibility of charging electric energy both in respect of a fixed geographic point in the form of a stationary electricity meter for e.g. a house property, and in respect of a user by means of an identification circuit for a power-consuming unit as described above. In future, the machines and apparatus concerned may already be provided with built-in identification circuits when being manufactured. The user may then, if he wishes so, register the unique identification code in the microprocessor of the identification circuit with an optional power company and, thus, bind himself to pay for the electric energy consumed when using the machine or apparatus. If one and the same user has a plurality of power-consuming units, these can be registered to be charged to the same account.

Figure 3:
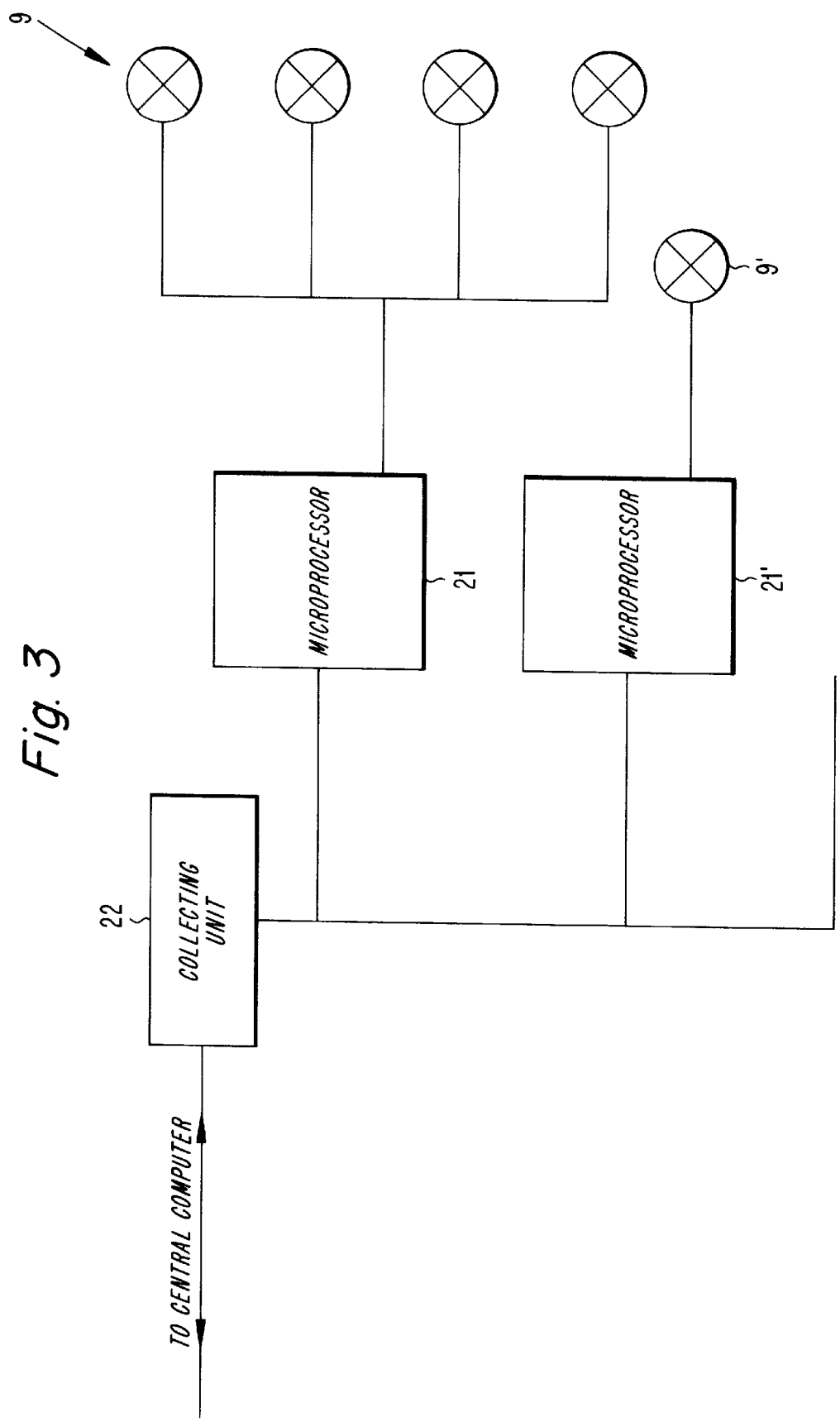

Reference is now made to FIG. 3 which is a schematic block diagram illustrating two different embodiments of tap-off facilities. More precisely, a first embodiment is shown, in which a common microprocessor 21, which can suitably be placed centrally in a switch cabinet or the like, regulates a group of socket means 9, for instance, in a car park or in a building accommodating a group of companies. Switches (not shown) for each socket means can be optionally placed in connection with the microprocessor 21 or the socket means 9. Below this, a tap-off facility is shown, at which a microprocessor 21', via a switch (not shown), regulates a single socket means 9'. In this embodiment it is convenient, but not necessary, that the microprocessor and the socket means as well as the switch are integrated into a unit.

At a suitable point in the network, for instance adjacent a transformer station, a collecting unit 22 is arranged, which respectively collects signals from and forwards them to a plurality of microprocessors. The collecting unit 22 is connected to a central computer and thus forwards the communication between the central computer and the respective tap-off facilities. In the network shown, the communication can be effected over short or long distances via signals superimposed on the distribution network, while the communication over the remaining distances is effected via conventional data circuits, radio communication or the like.

Figure 4:
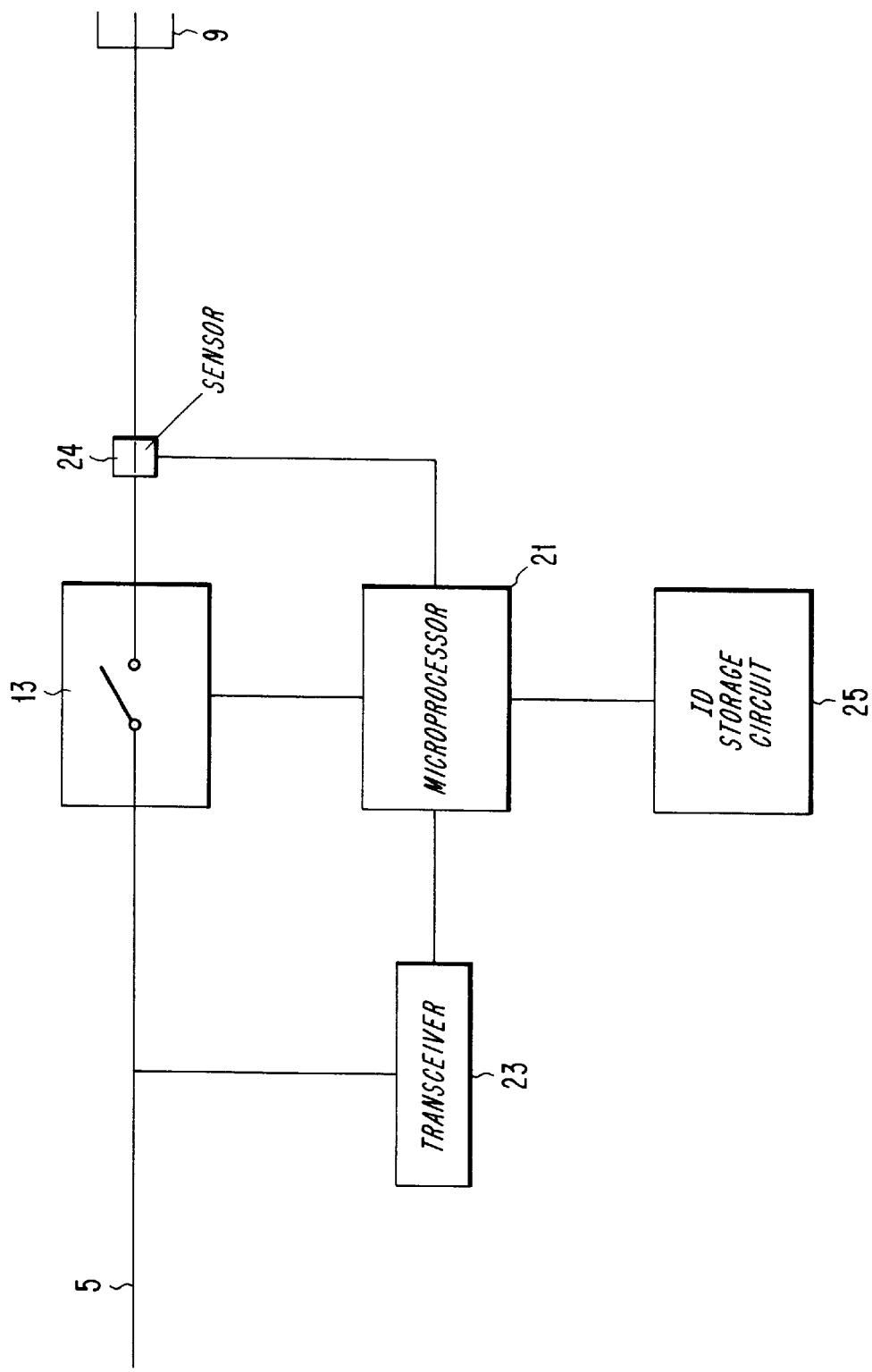

Reference is now made to FIG. 4 which is a schematic block diagram of a preferred embodiment of a regulating device 11. This comprises a microprocessor 21 which, via a transceiver 23, is connected to a power line 5. A switch, designated 13, is operable from the microprocessor, and the sensor designated 24 serves to sense when a power-consuming unit is connected to the socket means 9. A storage circuit 25 is connected to the microprocessor in order to further increase the storage capacity thereof and enable storing of identification codes for power-consuming units which are authorised to use the network.

FIG. 5 is a schematic block diagram of a preferred embodiment of an identification circuit for a power-consuming unit designated 1. A microprocessor 26 is, via a transceiver 27, connected to the network connection 8 and the associated socket means 28 of the power-consuming unit. A communication unit is designated 29 and can be, for instance, a display device and/or a keyboard, via which a user can communicate with the identification circuit and the network. The identification circuit may also comprise connections 30 to permit input of signals from e.g. a sensor and output of signals, such as alarm signals.

I claim:
1. A distribution network comprising:
electric wires for distributing electric current,
a plurality of tap-off facilities with at least one socket means for tapping off electric current to optional power-consuming units, and a central computer unit communicating with the individual tap-off facilities, wherein at least some tap-off facilities in the network comprise a switch and a regulating device with a microprocessor, a user connecting a power-consuming unit to one of said tap-off facilities being identifiable to the central computer unit or to the regulating device via a microprocessor in the power-consuming unit, and the regulating device, in case of accepted identification, keeping the switch closed and permitting tap-off of electric current from the socket means, whereas, in case of non-accepted identification, the regulating device keeps the switch open and prevents tap-off of electric current from the socket means and further wherein communication occurs wholly or partly via signals superimposed on the distribution network.

2. The distribution network as claimed in claim 1, wherein the tap-off facility comprises an electricity meter.

3. The distribution network as claimed in claim 1, wherein the tap-off facility comprises a time meter.

4. The distribution network as claimed in claim 1, wherein a plurality of central computer units are connected to a master computer.

5. The distribution network as claimed in claim 2, wherein a plurality of computer units are connected to a master computer.

6. The distribution network as claimed in claim 3, wherein a plurality of computer units are connected to a master computer.

7. A method for regulating the feeding of electric current to a power-consuming unit, comprising the steps of:

connecting the power-consuming unit to a tap-off facility in a distribution network, identifying a user by sending an identification signal from a microprocessor in the power-consuming unit to a central computer unit or a microprocessor-containing regulating device, closing, in case of accepted identification, a switch and permitting tap-off of electric current, but, in case of non-accepted identification, opening the switch and thus switching off the current, wherein said identification signal is sent over a same connection as said electric current, measuring consumed electric energy or a time period during which the power-consuming unit is connected, charging, on the basis of the identification signal, a person liable for payment in respect of the used power-consuming unit for the consumed electric energy.

8. The method as claimed in claim 7, further comprising the step of: keeping, in the unloaded state, the switch in an open switching-off position, and sensing the connecting of a power-consuming unit to the network in order to instantaneously switch on the current and permit identification.

9. The method of claim 7, further comprising the step of:
keeping said switch open until said power-consuming unit is connected to said tap-off facility.

10. The method of claim 7, further comprising the step of:
communicating information signals between said central computer unit and said tap-off facility using said distribution network.

11. A distribution network for electrical current comprising:
wires for distributing electrical current;
a central computer for controlling said network;
a tap-off facility connected to said wires and including:
an output socket for supplying said electrical current;
a switch for controlling supply of said electrical current to said output socket;
a regulating device for operating said switch; and
means for authorizing supply of current to said output socket using identification signals transmitted, at least in part, through said output socket, wherein one of said central computer and said regulating device permit supply of said electrical current to said output socket by placing or maintaining said switch in a closed state when said identification signals indicate an authorized condition.

12. The network of claim 11, wherein said tap-off facility further comprises:
a plurality of output sockets; and
a plurality of switches, each associated with one of said plurality of output sockets, wherein said regulating device individually controls said plurality of switches.

13. A regulating device for regulating supply of electrical current to an output socket comprising:
a switch for controlling supply of said electrical current to said output socket;
a sensing circuit for sensing connection of a power-consuming unit to said output socket; and
means, responsive to an indication from said sensing circuit, for communicating identification signals along a path including said output socket from said power-consuming unit to said regulating device and selectively closing said switch based on said identification signals to supply said electrical current to said output socket.

14. The regulating device as claimed in claim 13, further comprising an electricity meter on a time meter.

15. The regulating device as claimed in claim 14, wherein the switch consists of a semiconductor relay.

16. The regulating device as claimed in claim 14, wherein the socket means is completely dead in its unloaded state, closing of the switch being carried out by connecting an external current source which preferably is arranged in the power-consuming unit.

17. The regulating device as claimed in claim 14, wherein the output socket in its unloaded state is supplied with a voltage which is lower than the nominal voltage of the network for the purpose of reducing the risk of accidents, but permitting identification.

18. The regulating device as claimed in claim 13, wherein the switch consists of a semiconductor relay.

19. The regulating device as claimed in claim 18, wherein the socket output is completely dead in its unloaded state, closing of the switch being carried out by connecting an external current source which preferably is arranged in the power-consuming unit.

20. The regulating device as claimed in claim 18, wherein the output socket in its unloaded state is supplied with a voltage which is lower than the nominal voltage of the network for the purpose of reducing the risk of accidents, but permitting identification.

21. The regulating device as claimed in claim 13, wherein the output socket in its unloaded state is supplied with a voltage which is lower than the nominal voltage of the network for the purpose of reducing the risk of accidents, but permitting identification.

22. A distribution system for supplying electrical current to power-consuming units comprising:
wires for distributing electrical current;
a central computer for controlling said system;
a tap-off facility connected to said wires and including:
an output socket for supplying said electrical current;
a switch for controlling supply of said electrical current to said output socket;
a regulating device for operating said switch;
a power-consuming unit connected to said output socket:
means, associated with one of said central computer and said regulating device, for receiving identifying information associated with said power-consuming unit through a path including said output socket and for selectively supplying electrical current to said power-consuming device through said output socket in response to evaluation of said identifying information.

23. The system of claim 22, wherein said tap-off facility further comprises:
a plurality of output sockets; and
a plurality of switches, each associated with one of said plurality of output sockets, wherein said regulating device individually controls said plurality of switches.

24. The system of claim 22, wherein said power-consuming unit includes a microprocessor providing said identifying information.

25. The system of claim 24, wherein said microprocessor is housed in an adaptor which is removable from said power-consuming unit.

26. The system of claim 22, wherein said power-consuming unit includes a reading device for reading identifying information from an external medium and supplying said identifying information to said system via said output socket.

27. The system of claim 26, wherein said external medium is a card including a microprocessor.

28. The system of claim 22, further comprising:

means for communicating information signals between said central computer and said tap-off facility using said wires for distributing electrical current.

29. A regulating device for regulating supply of electrical current to an output socket comprising:

a switch for controlling supply of said electrical current to said output socket;

a sensing circuit for sensing connection of a power-consuming unit to said output socket and receiving identification signals from said power-consuming unit via said output socket; and means, responsive to an indication from said sensing circuit, for keeping said switch in an opened state until said power-consuming unit is connected to said output socket, whereby said electrical current is not flowing to said output socket and only closing said switch to supply said electrical current to said output socket when said power-consuming unit is connected thereto and a proper identification is provided.

* * * * *